US008661524B2

(12) United States Patent
KS et al.

(10) Patent No.: US 8,661,524 B2
(45) Date of Patent: Feb. 25, 2014

(54) SELECTIVE DESKTOP CONTROL OF VIRTUAL PRIVATE NETWORKS (VPN'S) IN A MULTIUSER ENVIRONMENT

(75) Inventors: Girish KS, Karnataka (IN); Gautham Chambrakana Ananda, Karnataka (IN); Vishnu Govind Attur, Karnataka (IN); Allu Babula, Orissa (IN)

(73) Assignee: Novell, Inc., Provo, UT (US)

( * ) Notice: Subject to any disclaimer, the term of this patent is extended or adjusted under 35 U.S.C. 154(b) by 1282 days.

(21) Appl. No.: 11/956,905

(22) Filed: Dec. 14, 2007

(65) Prior Publication Data

US 2009/0158420 A1 Jun. 18, 2009

(51) Int. Cl.
*G06F 21/00* (2013.01)

(52) U.S. Cl.
USPC .............................................. 726/15; 726/14

(58) Field of Classification Search
USPC ...................................................... 726/15, 14
See application file for complete search history.

(56) References Cited

U.S. PATENT DOCUMENTS

| 6,693,878 | B1 | 2/2004 | Daruwalla et al. | |
|---|---|---|---|---|
| 6,816,462 | B1 | 11/2004 | Booth, III et al. | |
| 7,054,319 | B2 | 5/2006 | Akahane et al. | |
| 7,159,125 | B2* | 1/2007 | Beadles et al. | 713/193 |
| 2003/0005115 | A1* | 1/2003 | Walker et al. | 709/225 |
| 2004/0088542 | A1* | 5/2004 | Daude et al. | 713/156 |
| 2004/0117653 | A1* | 6/2004 | Shapira et al. | 713/201 |
| 2005/0060561 | A1* | 3/2005 | Pearson et al. | 713/194 |
| 2005/0068961 | A1 | 3/2005 | Raghunath et al. | |
| 2005/0265308 | A1 | 12/2005 | Barbir et al. | |
| 2006/0106919 | A1* | 5/2006 | Watkinson et al. | 709/220 |
| 2006/0126644 | A1 | 6/2006 | Akahane et al. | |
| 2006/0190573 | A1* | 8/2006 | Chandra et al. | 709/220 |
| 2007/0097977 | A1* | 5/2007 | Boden et al. | 370/392 |
| 2007/0177575 | A1* | 8/2007 | Osenbach et al. | 370/351 |
| 2007/0245409 | A1* | 10/2007 | Harris et al. | 726/5 |
| 2007/0248085 | A1* | 10/2007 | Volpano | 370/389 |
| 2008/0155678 | A1* | 6/2008 | Ohkubo et al. | 726/15 |
| 2008/0235361 | A1* | 9/2008 | Crosbie et al. | 709/223 |
| 2008/0276304 | A1* | 11/2008 | Maffione et al. | 726/4 |

OTHER PUBLICATIONS

Robert Shimonski. "Using Remote Desktop with Windows XP Professional" Published Dec. 7, 2004 (14 pages) http://www.windowsnetworking.com/articles_tutorials/Using-Remote-Desktop-Windows-XP-Pro.html.*
Mike Erwin et al. "Virtual Private Networks, Second Edition" © 1998 O'Reilly Media Inc. Excerpts from Chapters 1 & 10 (20 pages).*
Peter Sayer. "Cisco speeds admin with Catalyst updates" Published Mar. 19, 2004 (3 pages) http://www.infoworld.com/t/networking/cisco-speeds-admin-catalyst-updates-533.*

(Continued)

*Primary Examiner* — Darren B Schwartz
*Assistant Examiner* — Thomas Gyorfi
(74) *Attorney, Agent, or Firm* — Schwegman Lundberg & Woessner, P.A.

(57) ABSTRACT

Techniques for selective desktop control of virtual private networks (VPN's) in a multiuser environment are provided. A multiuser desktop/workstation includes a first user that establishes a VPN session on the desktop for accessing protected resources. Other users are permitted to simultaneously access non-protected resources of the desktop during the VPN session. Other users are also permitted to log into the desktop during the VPN session. However, if the other users attempt to access the protected resources, the access attempts are denied.

19 Claims, 5 Drawing Sheets

(56) References Cited

OTHER PUBLICATIONS

Erum Frahim et al. "CCNP Self-Study: Understanding and Implementing Quality of Service in Cisco Multilayer Switched Networks" Excerpt from "CCNP Self-Study: Building Cisco Multilayer Switched Networks (BCMSN), 2nd Edition" published May 13, 2004 (3 pages) http://www.informit.com/articles/article.aspx?p=170743&seqNum=5.*

Michael H. Behringer et al. "MPLS VPN Security" Published Jun. 8, 2005 by Cisco Press. Excerpt from Chapter 5 (15 pages).*

"Multiple Simultaneous VPN Connections in OSX" Posted Apr. 18, 2006 from Maclive.net (5 pages) http://www.maclive.net/multiplesimultaneousvpnconnectionsinosx/.*

"OpenVPN™ 2.0 HOWTO" Web page dated Apr. 23, 2006 as verified by the Internet Archive (29 pages) http://web.archive.org/web/20060423000938/http://openvpn.net/howto.html#redirect.*

Mark Pilgrim. "What's New in Mac OS x 10.3 Panther" © 2003 Mark Pilgrim (2 pages) http://diveintoosx.org/panther/managing_users.html.*

* cited by examiner

SELECTIVE DESKTOP CONTROL OF VIRTUAL PRIVATE NETWORKS (VPN'S) IN A MULTIUSER ENVIRONMENT

BACKGROUND

Increasing the affairs of individuals and enterprises are being conducted in an automated manner over the Internet. Enterprises now engage in selling their products and services over the Internet; individuals also engage in communicating with one another over the Internet; employees may also engage in accessing secure resources of their employers over the Internet, etc.

One ever present and daunting issue with this activity is Internet security. Some transactions may be innocuous and may not require any substantial security. However, a growing number of transactions do involve sensitive material associated with enterprises and individuals, such as corporate secrets, personal data, etc. A variety of security mechanisms exist to address this issue.

For example, some enterprises may install dedicated connections for secure communications between parties. Yet, this approach is less pervasive with the advent of Virtual Private Network (VPN) techniques. A VPN permits an insecure connection to be used to achieve secure communications between parties engaged in a transaction.

VPN transactions use authentication and encryption techniques for purposes of ensuring that communications are secure. Essentially, a VPN permits insecure communications lines to be used in a secure manner.

A common challenge faced by most VPN solutions is the ability to restrict access on a client machine, which is providing a VPN to just one or to selective users when other users also desire access to the client but not necessarily to secure assets of the machine, which are under the control of the VPN session. Typically, the manner in which this is addressed is via a firewall, such that ports to the client are blocked and once a VPN is initiated any additional users desiring to log into the machine are blocked from doing so. Yet, this approach is obviously unacceptable for many valid users that have legitimate reasons to log into the machine without a VPN connection, where those valid users are actively blocked by the firewall because of the existence of the VPN connection that they are not interested in at all.

Consequently, there is a need for improved techniques for selectively controlling VPN access on a desktop having a multiuser environment.

SUMMARY

In various embodiments, techniques for selective desktop control of virtual private networks (VPN's) in a multiuser environment are provided. In an embodiment, a method for selective desktop VPN control is provided. More specifically, a VPN session is established on a client workstation for a first principal. Multiple second principals are permitted to log into the client workstation during the VPN session with the first principal. Connection requests from the first principal and the second principals are routed through a VPN client interface. The connection requests are directed to a protected resource, which is associated with the VPN session. Also, a policy is enforced in response to identities associated with the first principal and the second principal. Policy enforcement permits the first principal to connect to the protected resource via the VPN session and ensures denial of the second principals in their attempts to connect to the protected resource.

DETAILED DESCRIPTION

A "resource" includes a user, content, a processing device, a node, a service, an application, a system, a gateway, a directory, a data store, a World-Wide Web (WWW) site, an end-user, groups of users, combinations of these things, etc. The terms "service," "module," and "application" may be used interchangeably herein and refer to a type of software resource that includes instructions, which when executed by a machine performs operations that change the state of the machine and that may produce output. Additionally, a "principal" is a type of resource that actively interacts with other resources. So, a principal may be a user or an automated service.

A "client" is an environment on a machine (processing device, such as but not limited to a computer) that is enabled over a network and that includes resources and in some cases processes the resources (depending upon whether the resource is a software resource). As used herein the terms "client," "desktop," and "workstation" may be used interchangeably and synonymously.

A "server" is also an environment having one or more machines that is enabled over a network and that includes resources and in some cases processes the resources. The terms "client" and "server" when used in combination define a client-server architecture, where the client and server are remote from one another over a network connection, such as a wide-area network (WAN) and insecure public communications network such as the Internet. Both a client and a server may be viewed as types of resources similar to what was described above with reference to the principal.

The term "remote" is used relatively herein. In other words, when the term "remote" is used as an adjective to a noun it is remote or external to some other entity being referenced within the context of the modified noun. So, as an example: a remote application to a service means that the remote application is external to a local environment and local network associated with the service. In other contexts, the service may be viewed as being remote to the application when it is expressed as: a remote service to an application. Within any given context herein, the term remote is used consistently to identify what entity is in fact remote to what other entity.

A "processing environment" refers to one or more physical processing devices organized within a network. For example, several computers connected via a local area network (LAN) may collectively be viewed as a processing environment. The processing environment also refers to software configurations of the physical processing devices, such as but not limited to operating system, file system, directory service, etc. A client or desktop may have its own processing environment and also share a processing environment that is different with other machines connected to the client within a LAN.

A "virtual private network (VPN)" is a special type of network that is carved out of or tunneled through another network, such as an insecure network like the Internet. Technically, a VPN does not have to have security features it can be any sub network that tunnels out specific traffic.

Various embodiments of this invention can be implemented in existing network architectures, storage systems, security systems, data centers, and/or communication devices. For example, in some embodiments, the techniques presented herein are implemented in whole or in part in the Novell® network, proxy server products, email products, operating system products, data center products, and/or directory services products distributed by Novell®, Inc., of Provo, Utah.

Of course, the embodiments of the invention can be implemented in a variety of architectural platforms, operating and server systems, devices, systems, or applications. Any particular architectural layout or implementation presented herein is provided for purposes of illustration and comprehension only and is not intended to limit aspects of the invention.

It is within this context, that various embodiments of the invention are now presented with reference to the FIGS. 1-4.

Figure 1A:
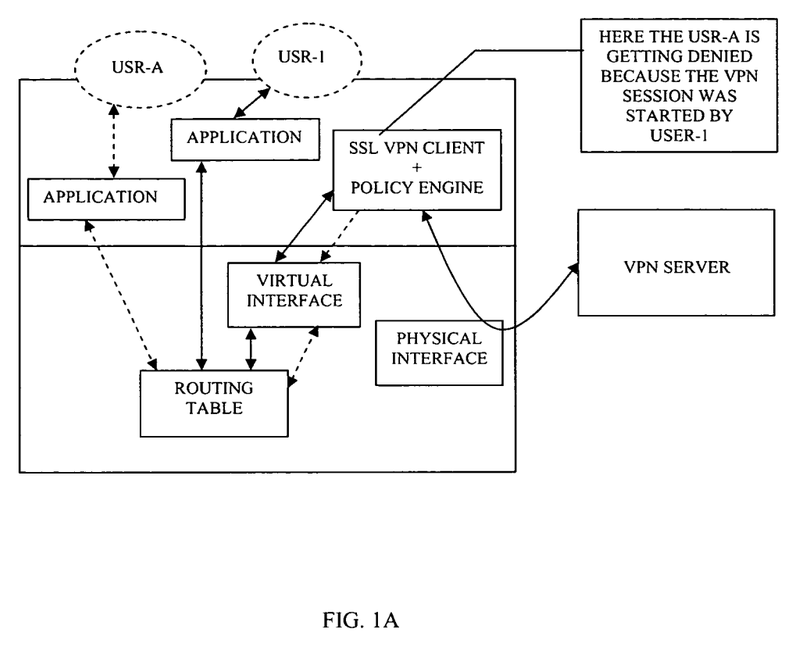
FIG. 1A is a diagram of an example layout for an architecture that provides selective virtual private network (VPN) control for a multiuser desktop environment, according to an example embodiment.

FIG. 1A is a diagram of an example layout for an architecture that provides selective virtual private network (VPN) control for a multiuser desktop environment, according to an example embodiment. The architecture is presented by way of illustration and comprehension only and is not intended to limit embodiments presented herein.

In FIG. 1A, the architecture presented represents within the dotted lines represents the architecture for a single desktop or client machine that supports multiple user connections and accesses to multiple resources of the desktop.

In FIG. 1A there are two defined users (principals as discussed above): user-A and user-1. User-1 has stated a Secure Socket Layer (SSL) VPN session. When user-1 starts the SSL VPN session, a virtual interface (e.g., OpenVPN, etc.) is created to manage the VPN session on the desktop machine. Every connection requests from the user-1 passes through the virtual interface; thus, it reaches the SSL VPN client process which, which does an access check (via the Policy Engine) and then transmits to a VPN server over the network (remote from the desktop) using an encrypted communication channel.

Each time user-1 attempts to access the VPN server the identity of user-1 is checked via the Policy Engine in the VPN client and the user-1's transaction is permitted. This is so, because user-1 started the VPN session.

As stated above the desktop, which is represented by the dashed lined box in the FIG. 1A, is a multiuser environment. This means that the desktop permits multiple users or includes a telnet server or something similar that allows remote users to log into the desktop.

So, when user-A is connected to the desktop and makes connection request traverses directed to the protected resource that connection request passes through the Routing Table and the Virtual Interface and ends up at the SSL VPN client process. From here, the identity of user-A is compared to policy managed by the Policy Engine and user-A is denied access to the VPN and the VPN server. Access to resources not associated with the VPN are not tracked and user-A can process unabated.

This technique is achieved by evaluating each packet that is transmitted on the desktop (that attempts to access a protected resource of the VPN) for that packet's source information (sender IP address and port information). The specific identity of the requesting user can be acquired using a netstat command (for example) to obtain a Process Identifier (PID) and Access Control (ACL) structures for purposes of obtaining the requesting user's (process owner) information.

Any packet transmitted that is not associated with a protected resource of the VPN session is permitted to proceed. In this manner, user-A can access non-protected resources (non VPN-designated resources) on the desktop and can log into the desktop at the same time and concurrent with the VPN session occurring between user-1 and the VPN server.

Filtering through the VPN client and using an identity-based approach within that VPN client with a policy engine that evaluates policy in view of user identities permits this technique.

Conventionally, it is very common to have multiple user desktop environments and for multiple users to be logged into the desktop at the same time. In a conventional scenario, if one user logged into the desktop and initiated a VPN connection to a protected resource, the existing logged in users can also get access to that protected resource. Additionally, any new user attempting to connected to the desktop will be denied access entirely even when that new user had no intentions of accessing the protected resource that is participating in the VPN session with the user that established the VPN session.

The technique shown and described above with reference to the FIG. 1A solves the problems faced with conventional approaches. Specifically, an access control mechanism is imposed at the desktop user level (via the Policy Engine of the SSL VPN Client) to prevent access to the protected resource by other non participating users. The SSL VPN client impasse access control policy for any connection initiated by applications on the desktop. So, when an application attempts to initiate a connection to a protected resource, the access control mechanism (SSL VPN Client and the Policy Engine) detects the identity of the user invoking the application. The user identity is verified against the user that initiated the VPN session on the desktop and access is allowed when the identities are the same; otherwise access is denied for users not having the needed identity that is associated with initiating the VPN session.

Again, the identities can be obtained by the SSL VPN client by obtaining the source IP address and port information of an incoming connection requests being made to the protected resource. The user information can then be acquired using commands, such as netstat, to get a PID and ACL structures associated with the process owner of the incoming connection requests.

Figure 1B:
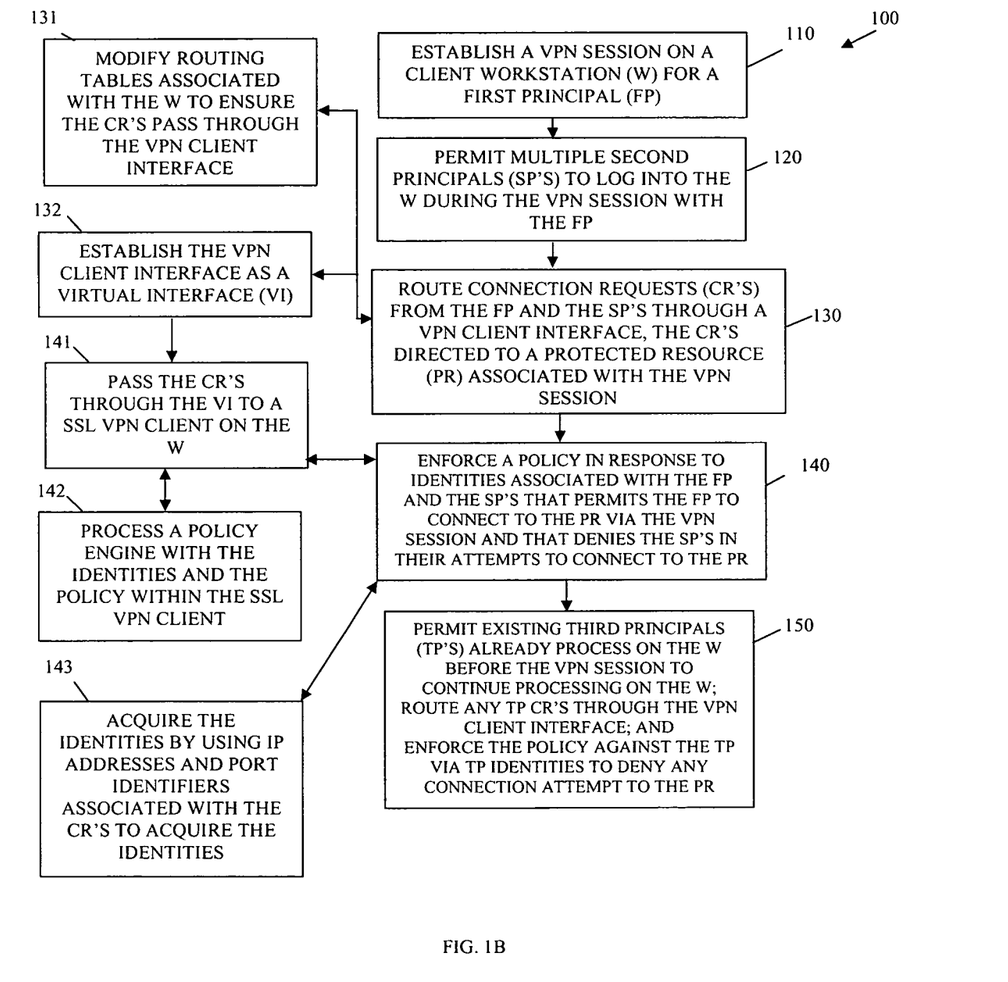
FIG. 1B is a diagram of a method for selective desktop control of a VPN in a multiuser environment, according to an example embodiment.

FIG. 1B is a diagram of a method 100 for selective desktop control of a VPN in a multiuser environment, according to an example embodiment. The method 100 (hereinafter "desktop VPN control service") is implemented as instructions in a machine-accessible and readable medium. The instructions when executed by a machine (computer or processing device) perform the processing depicted in FIG. 1B. The desktop VPN control service is also operational over and processes within a network. The network may be wired, wireless, or a combination of wired and wireless.

The desktop VPN control service represents processing associated with the architecture of the FIG. 1A, which was presented and discussed above in detail. Moreover, the processing actions of the desktop VPN control service may be viewed from the perspective of actions taken by a desktop/client that supports multiple concurrent user access, as presented above with reference to the FIG. 1A.

At 110, the desktop VPN control service establishes a VPN session on a client workstation for a first principal (e.g., user or automated service). The VPN session is established in manners associated with typical VPN session creation, where the first principal is authenticated to a protected resource and a secure tunnel is created between the first principal and the protected resource for secure communications between the first principal and the protected resource.

At 120, the desktop VPN control service permits multiple second principals (e.g., other users and/or other automated services that are different from the first principal) to log into the client workstation during the VPN session with the first principal. Conventionally, for security purposes because access to the VPN session could not be adequately protected, subsequent users would be denied log in access to the client workstation. Here, this is not the case, such that policy permits these multiple second principals to log into the client workstation during and while the VPN session is occurring with the first principal. The multiple second principals may log into the client workstation locally (directly to the client workstation or within a local area network (LAN) associated with the client workstation) or the multiple second may log in remotely (such as via telnet or other remote access methods over a wide area network (WAN), such as the Internet).

At 130, the desktop VPN control service routes connection requests (such as connect, sendto, etc.), which originate via applications that the first principal and the multiple second principals are using on the client workstation, through a VPN client interface. The connection requests are directed to a protected resource associated with the VPN session.

In an embodiment, at 131, the desktop VPN control service modifies routing tables associated with the client workstation to ensure the connection requests pass through the VPN client interface.

According to an embodiment, at 132, the desktop VPN control service is established as a virtual interface, such as OpenVPN.

At 140, the desktop VPN control service enforces an identity-based policy in response to identities associated with the first principal and the multiple second principals. Enforcement of the policy permits just the first principal to make connection requests to the protected resource and denies access to the multiple second principals that may be attempting to connect to the protected resource. This is done by inspecting the connection requests and deriving an identity of a particular principal that is using a particular application on the client workstation to make the connection requests. This can be done in a variety of manners, such as one discussed herein and below.

In an embodiment, at 141, and in connection with the embodiment discussed at 132, the desktop VPN control service passes the connection requests through the virtual interface to a secure socket layer (SSL) VPN client on the client workstation. The SSL VPN client is managing the VPN session between the first principal and the protected resource. At 142, the desktop VPN control service further processes a policy engine with the identities and the policy within the SSL VPN client to make the decision as to whether the connection requests are coming from the first principal, which is permissible, or the multiple second principals, which is not permissible. So, in this scenario the policy engine embedded within the SSL VPN client enforces the policy and decides whether to permit or deny any particular connection requests.

In an embodiment, at 143, the desktop VPN control service acquires the identities by using the Internet Protocol (IP) addresses and communication port identifiers associated with the applications that are submitting the connection requests to acquire the identities. One way to do this is to pass the IP addresses and the port identifiers to an operating system (OS) command, such as network statistics (netstats), which returns a process identifier from that an access control list (ACL) can also be acquired and from that the identity of the principal using the application can be known.

According to an embodiment, at 150, the desktop VPN control service also permits and ensures that existing third principals, who are already processing on the client workstation before the VPN session was established, are permitted to continue to process unabated on the client workstation after the VPN session is established. However, any connection requests made by these third principals are still routed through the VPN client interface and the same policy discussed above is enforced, such that none of these third principal can ever gain access to the protected resource when they attempt to do so.

It is now appreciate how a multiuser workstation can permit multiple users on a workstation while a VPN session occurs. Users can log in and out of the workstation and by using the techniques discussed above, only the user that established the VPN session can ever gain rightful access to the protected resource, which is associated with the VPN session. Conventionally this scenario was not possible.

Figure 2A:
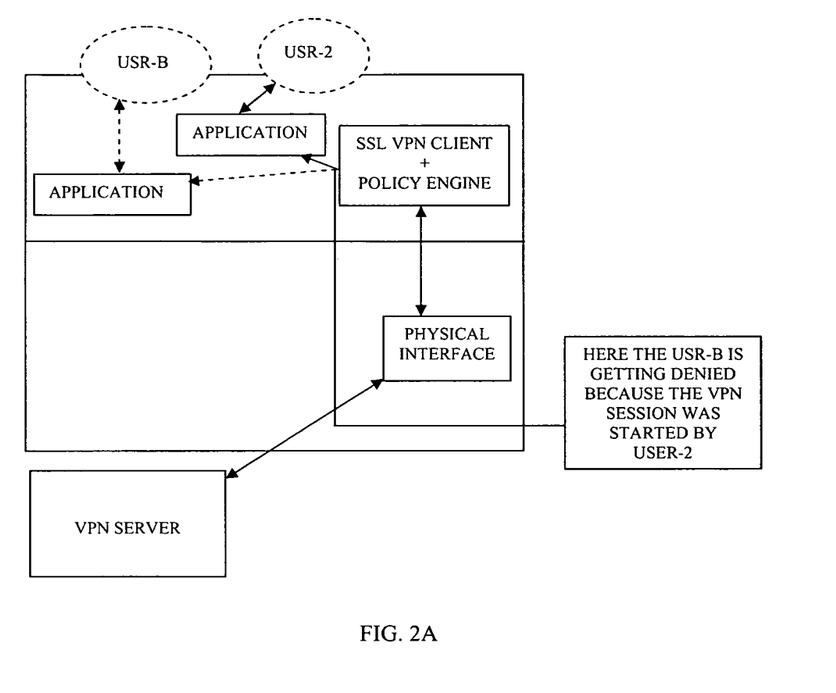
FIG. 2A is a diagram of another example layout for an architecture that provides selective VPN control for a multiuser desktop environment, according to an example embodiment.

FIG. 2A is a diagram of another example layout for an architecture that provides selective VPN control for a multiuser desktop environment, according to an example embodiment. The architecture is presented by way of illustration and comprehension only and is not intended to limit embodiments presented herein.

In FIG. 2A, the architecture presented represents within the dotted lines represents the architecture for a single desktop or client machine that supports multiple user connections and accesses to multiple resources of the desktop.

The FIG. 2A differs from the FIG. 1A in that the FIG. 2A describes an architecture for a SSL VPN, which involves intercepting and directing network traffic at the application layer, rather than the routing table layer as was described by way of the virtual interface depicted in the FIG. 1A.

However, similar to the discussion presented with the FIG. 1A, in the FIG. 2A connection-related information, such as source IP address and port number, is obtained by hooking into socket calls (e.g., connect, sendto, etc.) made by the application. This information is supplied to the Policy Engine (included within the VPN Client) each time it is detected through operations of the Applications, and the identity of the users making the socket calls via the Applications can be resolved. The proper policy enforcement is then applied.

So, if a VPN session was established on the desktop by user-2, then source packets that are only associated with user-2 are tunneled through the VPN to the protected resources. If another desktop user, such as user-B logs in remotely into the desktop/workstation and then tries to access protected resources of the VPN through the tunnel, that user-B is denied based on the policy administered via the Policy Engine of the SSL VPN client, which resides and processes on the desktop/workstation.

Figure 2B:
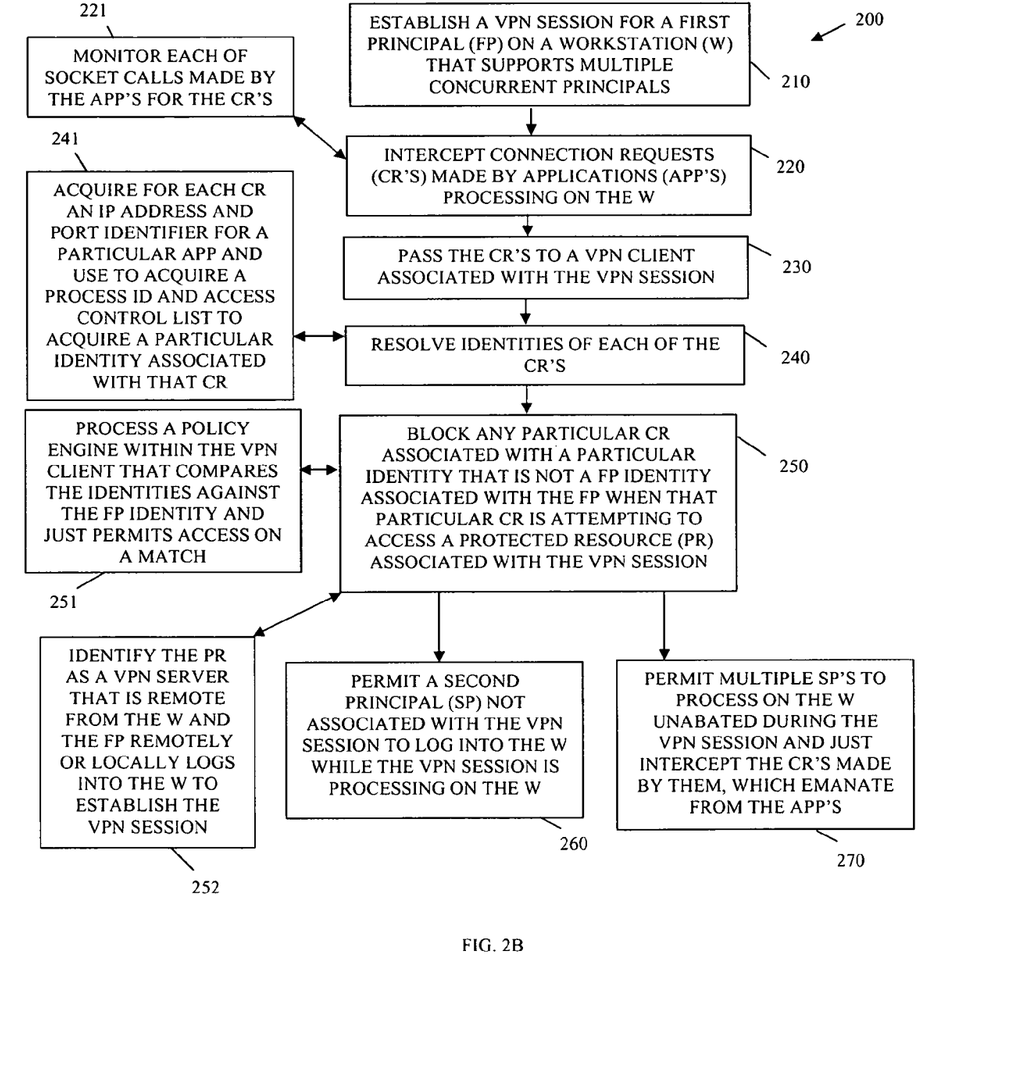
FIG. 2B is a diagram of another method for selective desktop control of a VPN in a multiuser environment, according to an example embodiment.

FIG. 2B is a diagram of another method 200 for selective desktop control of a VPN in a multiuser environment, according to an example embodiment. The method 200 (hereinafter "selective VPN control service") is implemented in a machine-accessible and readable medium as instructions. The instructions when executed by a machine perform the processing depicted in the FIG. 2B. Moreover, the selective VPN control service is operational over a network, and the network may be wired, wireless, or a combination of wired and wireless.

The selective VPN control service represents processing associated with the architecture of the FIG. 2A, which was presented and discussed above in detail. Moreover, the processing actions of the selective VPN control service may be viewed from the perspective of actions taken by a desktop/client that supports multiple concurrent user access, as presented above with reference to the FIGS. 1A and 2A.

At 210, the selective VPN control service establishes a VPN session for a first principal on a workstation that supports multiple concurrent users. It is noted that the selective VPN control service can use other VPN services to establish the VPN session on its behalf. So, any existing VPN service can be invoked to establish the VPN service on behalf of the first principal and a protected resource.

At 220, the selective VPN control service intercepts connection requests made by applications processing on the workstations. That is, the first principal and multiple other principals uses various applications that process on the workstation and these applications make connection requests, some of which may be directed to the protected resource that is associated with the VPN session.

According to an embodiment, at 221, the selective VPN control service performs interception of the connection requests by monitoring each socket call made by applications processing on the workstation. Any connection request directed to the protected resource is then detected and intercepted.

At 230, the selective VPN control service passes the intercepted connection requests to a VPN client that is also processing on the workstation.

At 240, the selective VPN control service, via the VPN client, resolves identities for principals associated with the intercepted connection requests.

For example, at 241, the selective VPN control service (via the VPN client) acquires for each intercepted connection request an IP address and communication port identifier for the particular application for which that connection request was intercepted. This information is used to acquire the process identifier (PID) and an ACL. The PID and the ACL is used to acquire the identity of the particular principal that was using the application to make the intercepted connection request. A netstats operation may be used to acquire the PID and ACL.

At 250, the selective VPN control service blocks any particular intercepted connection request, which is associated with a particular resolved identity for a particular principal, not associated with the first principal (the one who established the VPN session at 210) when the connection request is attempting to access the protected resource. Should any intercepted connection request be associated with a first principal identity for the first principal, then that particular connection request is permitted; so, the first principal can continue to access the protected principal.

In an embodiment, at 251, the selective VPN control service processes a policy engine within the VPN client. The policy engine compares the resolved identities against the first principal identity and just permits access to the protected resource when there is a match on the first principal identity.

According to an embodiment, at 252, the selective VPN control service identifies the protected resource as a VPN server that is remote from the workstation. The first principal that established the VPN session can initially log into the workstation locally or remotely.

In an embodiment, at 260, the selective VPN control service permits a second principal, who is not associated with the VPN session, to log into the workstation while the VPN session is processing on the workstation.

Additionally, in an embodiment, at 270, the selective VPN control service permit multiple second principals to process on the workstation unabated during the VPN session. These multiple second principals actively processed on the workstation before the VPN session was established at 210. The selective VPN control service just intercepts any connection requests made by the multiple second principals. The connection requests emanate from the applications that the multiple second principals are using on the workstation. So, the multiple second principals are not able to access the VPN session and the protected resource associated with the VPN session between the first principal and the protected resource.

Figure 3:
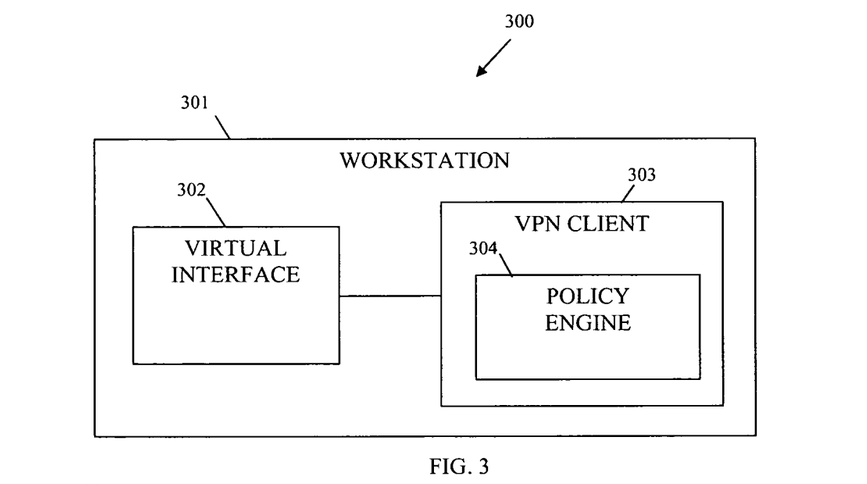
FIG. 3 is a diagram of a selective VPN access system, according to an example embodiment.

FIG. 3 is a diagram of a selective VPN access system 300, according to an example embodiment. The selective VPN access system 300 is implemented as instructions on or within a machine-accessible and readable medium. The instructions when executed by one or more machines perform, among other things, processing depicted with respect to the method 100 of the FIGS. 1A and 1B. The selective VPN access system 300 is also operational over a network, and the network may be wired, wireless, or a combination of wired and wireless.

The selective VPN access system 300 includes workstation processing machine (workstation) 301, a virtual interface 302, and a VPN client. In an embodiment, the VPN access system 300 includes a policy engine 303. Each of these and their interactions with one another will now be discussed in turn.

The workstation 301 is a processing device, such as a computer or any device having processor and memory capabilities. The workstation 301 permits multiple current principals to be logged into and access its resources. The remaining components of the VPN access system 300 includes reside within the workstation 301 as instructions that execute on the workstation 301.

The virtual interface 302 is implemented in a machine-accessible and computer-readable medium that processes on the workstation 301. Example discussion associated with the virtual interface 302 was presented above with reference to the FIGS. 1A and 1B.

The virtual interface 302 receives all connection requests made on the workstation 301 that are directed to a protected resource associated with an existing VPN session. So, each connection request made on the workstation passes through the virtual interface 302. The virtual interface 302 forwards the connection requests to the VPN client 303.

In an embodiment, the virtual interface 302 monitors or is designed to receive from routing tables the connection requests. The connection requests emanate from applications processing on the workstation 301. The connection requests are initiated from a first principal (for who the existing VPN session is established) and from multiple different principals (for who the existing VPN session is not associated with) via the applications.

The first principal previously remotely or locally log into the workstation 301 to initially establish the already existing VPN session.

Moreover, multiple second principals can remotely or locally log into the workstation 301 during the existing VPN session. Each of the principals associated with a particular unique identity and each of these principals are denied or blocked from accessing the protected resource associated with the existing VPN session in the manners discussed herein above and below.

In an embodiment, the virtual interface 302 is OpenVPN.

The VPN client 303 is implemented in a machine-accessible and computer-readable medium that is also to process on the workstation 301. Example processing associated with the VPN client 303 was discussed in detail above with reference to the FIGS. 1A, 1B, 2A, and 2B.

The VPN client 303 uses identity-based policy to block any particular connection request that is not associated with the first principal. The first principal established or caused to be established the existing VPN session presently processing on the workstation 301. Example processing associated with the VPN client 303 and techniques for achieving this were discussed in detail above with reference to the FIGS. 1A, 1B, 2A, and 2B.

According to an embodiment, the virtual interface 302 and the VPN client 303 are dynamically initiated and processed on the workstation 301 when the existing VPN session was initially created or caused to be created by the first principal. In other words, the virtual interface 302 and the VPN client 303 are created and processed when needed to establish the VPN session for the first principal.

In some embodiments, the VPN access system 300 includes a policy engine 304. The policy engine 304 is implemented in a machine-accessible and computer-readable medium and is to process on the workstation and within the execution space of the VPN client 303. Example processing associated with the policy engine 304 was discussed above with reference to the FIGS. 1A, 1B, 2A, and 2B.

The policy engine 304 derives the identities from the connection requests and enforces identity-based policy on behalf of the VPN client 303.

Figure 4:
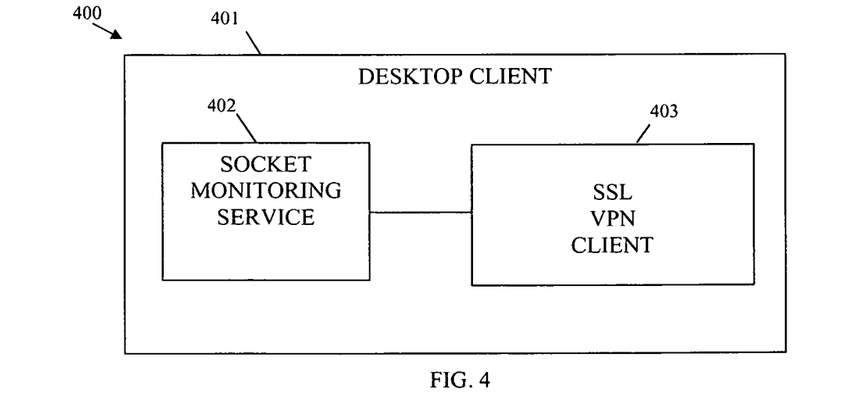
FIG. 4 is a diagram of another selective VPN access system, according to an example embodiment.

FIG. 4 is a diagram of another selective VPN access system 400, according to an example embodiment. The selective VPN access system 400 is implemented as instructions on or within a machine-accessible and readable medium. The instructions when executed by one or more machines perform, among other things, processing depicted with respect to the method 200 of the FIGS. 2A and 2B. The selective VPN access system 400 is also operational over a network, and the network may be wired, wireless, or a combination of wired and wireless.

The selective VPN access system 400 includes a desktop client processing machine 401, a socket monitoring service 402, and a secure socket layer (SSL) VPN client 403. Each of these and their interactions with one another will now be discussed in turn.

The desktop client processing machine 401 (desktop client) is a computer or any device having processor and memory capabilities. The remaining components of the selective VPN access system 400 execute on and within the processing environment of the desktop client 401.

The desktop client 401 supports multiple concurrent users that process applications on the desktop client 401.

During operation of the system 400, when a first user establishes or requests to be established a VPN session on the desktop client 401, the SSL VPN client 403 is initiated and processed on the desktop client 401.

The socket monitoring service 402 is implemented in a machine-accessible and computer readable medium that is to process/execute on the desktop client 401. Example processing associated with the socket monitoring service was discussed above with reference to the FIGS. 2A and 2B.

The socket monitoring service 402 monitors socket calls made by applications, which also process on the desktop client 401, and then passes the intercepted socket calls to the SSL VPN client 403.

The SSL VPN client 403 is implemented in a machine-accessible and computer-readable medium that is also to process on the desktop client 401. Example processing associated with the SSL VPN client 403 was discussed above with reference to the FIGS. 1A, 1B, 2A, and 2B.

The SSL VPN client 403 establishes or resolves user identities for each of the intercepted socket calls and just permits particular socket calls that are associated with the first user when those socket calls are directed to protected resources associated with the VPN session. Remaining socket calls with user identities not associated with the first user are blocked by the SSL VPN client 403.

According to an embodiment, the SSL VPN client 403 acquires IP addresses and port identifiers for the intercepted socket calls. This information is further used to then resolve process identifiers for the socket calls. The process identifier is acquired via an OS netstats operation when the IP addresses and port identifiers are supplied to the netstats operation. The process identifier permits the identity of the users to be acquired along with ACL's for a particular intercepted socket call. The acquired identity can then be compared against an identity associated with the first user and any socket call not associated with the first user denied access to the protected resources of the VPN session.

Any new users are permitted to log into the desktop client 401 while the VPN session is being processed on the desktop client 401.

It is now appreciated how multiple concurrent desktop users can remotely/locally log into a desktop/client/workstation, where that desktop has a VPN client running an active VPN session. Users not associated with initiating the VPN session are permitted access to the desktop but are prevented from accessing any protected resource associated or controlled by the VPN session. Just the user that initiates the VPN session is permitted access to the protected resources of the desktop.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A machine-implemented method, comprising:
   establishing a virtual private network (VPN) session between a client workstation that is a desktop and a first principal that is a user, the VPN session established by the first principal;
   permitting multiple second principals to remain logged into the client workstation during the VPN session with the first principal, the multiple second principals having different sessions and not part of the VPN session between the first principal and the client workstation, the multiple second principals are second users different from the user and where logged into the client workstation before the first principal established the VPN session;
   routing connection requests that originate from applications used by the first principal and the second principals through a VPN client interface, wherein the connection requests are directed to a protected resource that is part of the VPN session with the first principal; and
   enforcing a policy in response to identities associated with the first principal and the second principal that permits the first principal to connect to the protected resource via the VPN session and that denies the second principals in their attempts to connect to the protected resource, and other connection requests from the multiple second principals directed to other resources that are not part of the VPN session and that are not protected resources are permitted to proceed during the VPN session independent, and the identities are acquired by passing Internet Protocol (IP) addresses and communication port identifiers for the first principal and the second principals to an operating system command that returns process identifiers for the connection requests, the process identifiers are searched in an Access Control List (ACL) to obtain the identities for the first principal and the second principals and to acquire corresponding permissions for access to the protected resource.

2. The method of claim 1 further comprising:
   permitting existing third principals that where processing on the workstation before the VPN session was established to continue processing on the workstation after the VPN session is established;
   routing any third principal connection requests through the VPN client interface; and
   enforcing the policy against third principals via third principal identities to deny any connection attempt that the third principals make in their attempts to connect to the protected resource.

3. The method of claim 1, wherein routing further includes modifying routing tables associated with the workstation to ensure the connection requests pass through the VPN client interface.

4. The method of claim 1, wherein routing further includes establishing the VPN client interface as a virtual interface.

5. The method of claim 4, wherein recognizing further includes passing the connection requests through the virtual interface to a secure socket layer (SSL) VPN client on the workstation.

6. The method of claim 5, wherein enforcing further includes processing a policy engine with the identities and the policy within the SSL VPN client.

7. A machine-implemented method, comprising:
   establishing a virtual private network (VPN) session between a first principal who is a first user and a workstation that supports multiple concurrent principals who are other second users, the VPN session established by the first principal and the other second users logged into the workstation before the VPN session was created and remain logged into after the VPN session is created;
   intercepting all connection requests made by applications processing on the workstation;
   passing the intercepted connection requests to a VPN client associated with the VPN session;
   resolving identities of each of the connection requests by passing Internet Protocol (IP) addresses and communication port identifiers for each of the applications processing on the workstation to an operating system command that returns process identifiers for each of the applications and searching an Access Control List (ACL) with the process identifiers to resolve the identities for the applications associated with the connection requests and to obtain permissions to a protected resource; and
   blocking any particular connection request associate with a particular identity that is not a first principal identity associated with the first principal when that particular connection request is attempting to access the protected resource associated with the VPN session, the particular connection request associated with a concurrent session of the workstation with a different principal who is a different user from the first principal, the concurrent session is not part of the VPN session and permitting the particular connection request to access a non protected resource not associated with the VPN session when the particular connection request is not directed to the protected resource and is directed to the non protected resource.

8. The method of claim 7, wherein intercepting further includes monitoring socket calls made by the applications for the connection requests.

9. The method of claim 7 further comprising, permitting a second principal not associated with the VPN session to log into the workstation while the VPN session is processing on the workstation.

10. The method of claim 7 further comprising, permitting multiple second principals to process on the workstation unabated during the VPN session and just intercepting the connection requests that the second principals attempt to make while processing on the workstation via detection of the connection requests that emanate from the applications.

11. The method of claim 7, wherein blocking further includes identifying the protected resource as a VPN server that is remote from the workstation and wherein the first principal either remotely logs into the workstation to establish the VPN session or locally logs into the workstation to establish the VPN session.

12. A machine-implemented system, comprising:
    a workstation processing machine;
    a virtual interface implemented in a machine-accessible and computer-readable medium that processes on the workstation; and
    a virtual private network (VPN) client implemented in a machine-accessible and computer-readable medium that processes on the workstation;
    wherein all connection requests made on the workstation to a protected resource of an existing VPN session occurring on the workstation processing machine passes through the virtual interface, and wherein the virtual interface forwards the connection requests to the VPN client, the VPN client uses identity-based policy to block any particular connection request that is not associated with a first principal that established the existing VPN session on the workstation, the first principal a first user, the existing VPN session established by the first principal, the particular connection request associated with a different concurrent session occurring on the workstation processing machine from the existing VPN session and the particular connection request originating from a particular application used by a second principal, who is a second user, the second user logged into the workstation before the existing VPN session was established and remains logged into the workstation after the existing VPN session is established, and wherein identities are resolved by passing Internet Protocol (IP) addresses and communication port identifiers for applications associated with the connection requests to an operating system command that returns process identifiers for the applications, the process identifiers are searched in an Access Control List to obtain the identities and permissions to the protected resource, other connection requests not associated with the existing VPN session and associated with the second user are permitted to proceed and access non protected resources on the workstation.

13. The system of claim 12, wherein the virtual interface is to monitor routing tables on the workstation to acquire the connection requests, which emanate from applications processing on the workstation by multiple different principals and the first principal.

14. The system of claim 12 further comprising a policy engine implemented iii a machine-accessible and computer readable medium and to process within the machine and within the VPN client, wherein the policy engine derives the identities from the connection requests and enforces the identity-based policy.

15. The system of claim 12, wherein the first principal remotely or locally logs into the workstation to establish the existing VPN session.

16. The system of claim 12, wherein multiple second principals remotely or locally log into the workstation during the existing VPN session, the multiple second principals associated with particular ones of the identities that are blocked from accessing the protected resource of the existing VPN session.

17. The system of claim 12, wherein the virtual interface and the VPN client are dynamically initiated and processed on the workstation when the existing VPN session was initially created by the first principal.

18. A machine-implemented system, comprising:
a desktop client processing machine;
a socket monitoring service implemented in a machine-accessible and computer-readable medium and to process on the desktop client; and
a secure socket layer (SSL) virtual private network (VPN) client implemented in a machine-accessible and computer-readable medium and to process on the desktop client;
wherein the desktop client supports multiple concurrent users that process applications on the desktop client, and wherein when a first user establishes a VPN session with the desktop client processing machine, the multiple concurrent users logged onto the desktop client before the first user establishes the VPN session and remain logged into the desktop client after the VPN session is established, the SSL VPN client is initiated and processed on the desktop client, and wherein when the VPN session is established the socket monitoring service monitors all socket calls made by the applications and passes the socket calls to the VPN client, the VPN client establishes user identities for each of the socket calls and just permits particular socket calls that are associated with the first user to access protected resources tied to the VPN session, remaining ones of the socket calls associated with other users that are not the first user are blocked by the SSL VPN client, the remaining ones of the socket calls are associated with concurrent sessions on the desktop client processing machine that are different from the VPN session and that originate from particular applications initiated by second users, the concurrent sessions are permitted to access non protected resources on the desktop client, the user identities for the socket calls resolved by passing Internet protocol (IP) addresses and communication port identifiers to an operating system command that returns process identifiers, the process identifiers are searched in an Access Control List to obtain the user identities and access permissions to the protected resource.

19. The system of claim 18, wherein new users are permitted to log into the desktop client while the VPN session is being processed on the desktop client.

* * * * *

UNITED STATES PATENT AND TRADEMARK OFFICE
CERTIFICATE OF CORRECTION

PATENT NO.       : 8,661,524 B2                                        Page 1 of 1
APPLICATION NO.  : 11/956905
DATED            : February 25, 2014
INVENTOR(S)      : KS et al.

It is certified that error appears in the above-identified patent and that said Letters Patent is hereby corrected as shown below:

In the Claims

In column 12, line 18, in Claim 7, delete "associate" and insert --associated--, therefor In column 13, line 27, in Claim 14, delete "iii" and insert --in--, therefor Signed and Sealed this
Twenty-seventh Day of May, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,661,524 B2 | Page 1 of 1 |
| APPLICATION NO. | : 11/956905 | |
| DATED | : February 25, 2014 | |
| INVENTOR(S) | : Ks et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1420 days.

Signed and Sealed this
Second Day of June, 2015

Michelle K. Lee
*Director of the United States Patent and Trademark Office*